United States Patent [19]

Bunn, Jr. et al.

[11] 4,051,069
[45] Sept. 27, 1977

[54] FLUIDIZED CATALYTIC CRACKING REGENERATION PROCESS

[75] Inventors: Dorrance P. Bunn, Jr.; Dale Williams; Henry B. Jones, all of Houston; John P. MacLean, Stafford, all of Tex.

[73] Assignee: Texaco Inc., New York, N.Y.

[21] Appl. No.: 684,505

[22] Filed: May 7, 1976

[51] Int. Cl.$^2$ .................. B01J 29/38; B01J 21/20; C10G 11/18
[52] U.S. Cl. .................. 252/417; 23/288 B; 23/288 S; 208/113; 208/120; 208/164; 252/419
[58] Field of Search .......... 252/417, 419; 208/113, 208/120, 164; 23/288 B

[56] References Cited
U.S. PATENT DOCUMENTS

| | | | |
|---|---|---|---|
| 2,327,175 | 8/1943 | Conn | 252/417 |
| 2,382,382 | 8/1945 | Carlsmith et al. | 252/417 |
| 3,886,060 | 5/1975 | Owen | 208/120 |
| 3,903,016 | 9/1975 | Owen | 252/417 |
| 3,909,392 | 9/1975 | Horecky, Jr. et al. | 208/120 |
| 3,923,642 | 12/1975 | Luckenbach | 208/164 |
| 3,964,876 | 6/1976 | James | 23/288.5 |
| 3,974,091 | 8/1976 | Parker | 252/417 |

Primary Examiner—Winston A. Douglas
Assistant Examiner—P. E. Konopka
Attorney, Agent, or Firm—Carl G. Ries; Thomas H. Whaley; Douglas H. May, Jr.

[57] ABSTRACT

A process is described herein for regeneration of spent, coke contaminated fluidized cracking catalyst by burning coke therefrom with a molecular oxygen containing regeneration gas in a fluidized dense phase bed, and for burning substantially all carbon monoxide formed to carbon dioxide. A method is provided for balancing oxygen concentration across the cross-sectional area of the dense phase bed, as is a method for supplying additional oxygen above the dense phase bed for combustion of carbon monoxide. Additionally, a method is provided for transferring heat from a dilute phase back to the fluidized dense phase bed.

9 Claims, 1 Drawing Figure

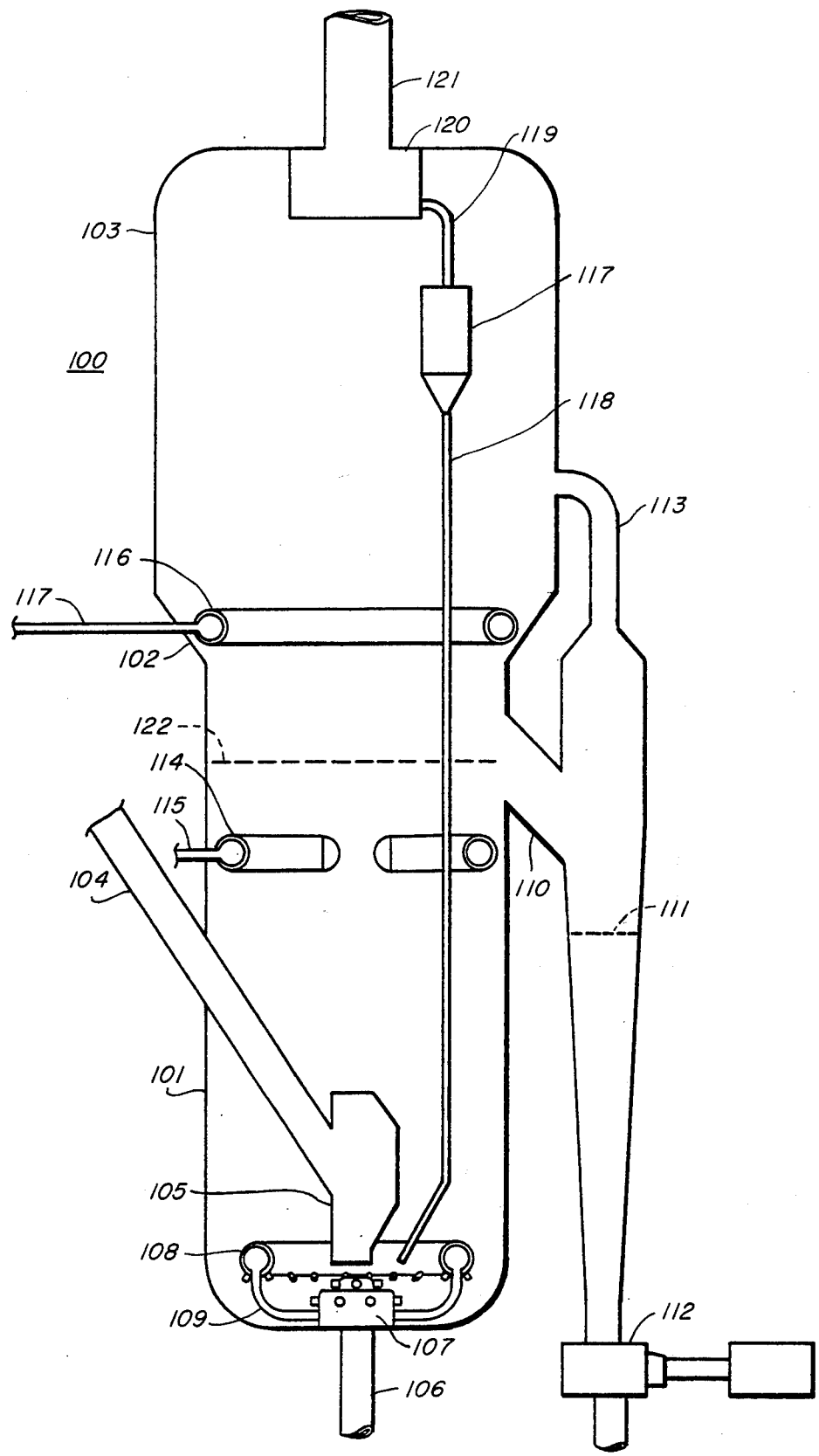

FLUIDIZED CATALYTIC CRACKING REGENERATION PROCESS

The present invention relates to fluidized catalytic cracking of hydrocarbons. In particular, the present invention relates to a process for regeneration of zeolitic molecular sieve containing fluidizable cracking catalyst.

Fluidized catalytic cracking processes are well known and widely practiced in petroleuum refineries. Such processes comprise contacting hydrocarbon charge with hot, regenerated, fluidized cracking catalyst in a reaction zone under cracking conditions for conversion of hydrocarbon charge into cracked hydrocarbon products with the concomitant deposition of carbonaceous materials (coke) upon the catalyst; separating cracked hydrocarbon vapors from the coke contaminated catalyst (spent catalyst) within the reaction zone; recovering as product the cracked hydrocarbon vapors essentially free of entrained catalyst; stripping, in a stripping zone, volatile hydrocarbons from the spent catalyst by contact with stripping vapors; regenerating, in a regeneration zone, the coke contaminated stripped catalyst by burning coke therefrom with a molecular oxygen containing regeneration gas at an elevated temperature for restoring activity to the regenerated catalyst; and contacting hot, regenerated catalyst with additional hydrocarbon charge in the reaction zone, as described above.

In fluidized catalytic cracking processes for conversion of normally liquid hydrocarbons, such as petroleum fractions, into lower boiling hydrocarbons, it is well known to employ catalysts comprising zeolytic alumino-silicate molecular sieves to obtain increased conversion of hydrocarbon charge into useful, lower boiling hydrocarbons, particularly into naphtha fractions useful as motor fuels. Such catalysts comprise an amorphous matrix such as silica-alumina, silica magnesia, etc. containing a minor portion of crystalline zeolytic aluminosilicate molecular sieves, having uniform crystalline pore openings, which have been ion exchanged with rare earth ions, magnesium ions, hydrogen ions, ammonium ions and/or other divalent and polyvalent ions for reduction of the sodium content of said molecular sieves to not more than one weight percent, and preferably less. These cracking catalysts (hereinafter referred to as "zeolite catalysts") are well-known and commercially available. The activity and selectivity of such zeolite catalysts for conversion of hydrocarbon charge stocks into useful cracked hydrocarbon products, particularly naphtha, are particularly affected by residual carbon remaining on regenerated catalyst. For obtaining the full utility and benefit of the activity and selectivity of such zeolite catalysts, carbon on regenerated catalyst is maintained below 0.2 weight percent, and preferably 0.07 weight percent or less.

SUMMARY OF THE INVENTION

Now, according to the present invention an improved process is disclosed for regeneration of spent coke contaminated cracking catalyst from a fluidized catalytic cracking reaction zone by burning coke from said spent catalyst with a molecular oxygen containing regeneration gas in a regeneration vessel to produce flue gas comprising oxides of carbon, and regenerated catalyst containing 0.1 weight percent or less residual carbon. In a preferred embodiment said flue gas comprises 500 parts per million by weight (wppm), or less, carbon monoxide.

In the process of the present invention, coke contaminated spent catalyst from a fluidized catalytic cracking reaction zone is directed substantially vertically downward into the radial center of a first cylindrical regeneration zone, having a closed bottom and open top, wherein said spent catalyst is contacted, at catalyst regeneration conditions, for a residence time of about 10 seconds to about 1 minute, with a primary regeneration gas, e.g., air, sufficient in amount to provide at least the stoichometric amount of oxygen required for burning the coke contained upon said spent catalyst to carbon dioxide and water. Said primary regeneration gas is radially introduced into said first regeneration zone through a plurality of nozzles at a velocity in the range of about 60–175 ft/sec, for radially distributing and thoroughly mixing said spent catalyst and primary regeneration gas within said first regeneration zone, and for initiating burning of coke from said spent catalyst. From the open top of said first regeneration zone, catalyst and regeneration gas, containing oxygen and oxides to carbon, enter a second cylindrical regeneration zone, forming a homogeneous fluidized dense phase catalyst bed having an upper surface, a bulk density in the range of about 18 to 30 lb/cu ft, a regeneration gas superficial vapor velocity in the range of about 2.5 to about 6.0 ft/sec, and a catalyst residence time of about 3–20 minutes to provide a specific coke burning rate of from about 0.05 to about 1.0 pounds of coke per hour per pound of catalyst, for burning substantially all the coke from said catalyst.

From the upper surface of said fluidized dense phase catalyst bed, regeneration gas comprising nitrogen, oxides of carbon and water vapor, being substantially spent in oxygen content, and containing entrained catalyst, enters the bottom of a frustoconic transition zone wherein said spent regeneration gas superficial vapor velocity decreases from the superficial vapor velocity within the second regeneration zone to a superficial vapor velocity within the range of about 1.0 to about 2.2 ft/sec, wherein a major portion of the entrained catalyst disengages the upflowing spent regeneration gas and re-enters the fluidized dense phase catalyst bed under the influence of gravity, and wherein said spent regeneration gas, containing a minor portion of still entrained catalyst, exits the upper end of said transition zone.

From the upper end of said transition zone, spent regeneration gas and entrained catalyst enter a third cylindrical regeneration zone, having an open bottom and closed top, therein forming a dilute phase of catalyst suspended in spent regeneration gas, having a bulk density in the range of about 0.15 to 1.0 lb/cu ft, and a superficial vapor velocity of about 1.0 to 2.2 ft/sec. Said dilute phase is separated, in a cyclone separation zone in a hot catalyst phase and a flue gas comprising oxides of carbon and essentially free of entrained catalyst. Said flue gas is vented from the regeneration process. The hot catalyst from the cyclone separation zone is returned to the first regeneration zone for adding heat to spent catalyst and primary regeneration gas entering said first regeneration zone.

Regenerated catalyst, containing about 0.1 weight percent, or less, residual carbon is withdrawn, via a regenerated catalyst ductway, from the upper portion of the dense phase fluidized catalyst bed contained in said second regeneration zone, in a manner such that the homogeneity of the dense phase fluidized catalyst bed is not disturbed, for subsequent contact with hydrocarbon charge in a fluidized catalytic cracking zone. At regeneration temperatures in the range of about 1050°-1350° F, and fluidized dense phase catalyst residence times in the range of about 3-20 minutes, substantially all the coke on spent catalyst is burned such that the regenerated catalyst contains about 0.01-0.1 weight percent residual carbon.

In one embodiment of the process of the present invention, trim gas, e.g., air, is radially distributed into the upper portion of said dense phase fluidized catalyst bed, below the regenerated catalyst ductway via a plurality of separately controlled injection means. Said trim gas is injected in a downward direction of about 30° to about 60° from the horizontal, at a nozzle velocity of about 60-175 ft/sec, in an amount equivalent to about 1 to about 5 percent of said primary regeneration gas injected into said first regeneration zone, for maintaining even distribution of catalyst and upflowing regeneration gas and thereby maintaining a homogeneous fluidized dense phase catalyst bed.

In another embodiment of the process of the present invention, wherein primary regeneration gas is supplied to said first regeneration zone in an amount to provide substantially the stoichometric oxygen requirement for combusting coke on spent catalyst to carbon dioxide and water, secondary regeneration gas is injected radially into said frusto-conic transition section in an amount equivalent to about 1-10% of the primary regeneration gas for combustion of substantially all the carbon monoxide present in the spent regeneration gas, to carbon dioxide. Said secondary regeneration gas is injected into said transition zone via a plurality of nozzles, at nozzle outlet velocities in the range of 65-175 ft/sec, in a direction in the range from horizontal to about 45° downward from horizontal. A substantial portion of the heat of carbon monoxide combustion is absorbed by entrained catalyst in the transition zone and is transferred to the fluidized dense phase catalyst bed with the catalyst which settles under the influence of gravity, such that the temperature in the transition zone does not exceed a temperature at which the catalyst will be substantially damaged. Under such operating conditions, carbon monoxide content of spent regeneration gas is reduced to the range of 0-500 ppmw.

The objects of obtaining regeneration of spent zeolite catalyst to a residual carbon content of 0.1 wt. percent or less with concomitant production of a flue gas containing only a small amount of carbon monoxide are advantageously achieved in the process of the present invention. Turbulent contact of downflowing spent catalyst and primary regeneration gas in the first regeneration zone results in rapid mixing before the catalyst and regeneration gas enter the fluidized dense phase bed. Thus, a homogeneous bed of fluidized catalyst is established in the second regeneration zone. Withdrawal of regenerated catalyst from the upper portion of the fluidized bed to a regenerated catalyst hopper external to the regeneration zone serves to preserve the homogeneity of the dense phase fluidized bed which internal standpipes tend to disrupt. Additionally, should inhomogenities develop in the fluidized dense phase bed, additional trim gas may be injected into the portion of the dense phase bed which are oxygen deficient, thus restoring homogeneity to the fluidized dense phase bed. All catalyst undergoing regeneration within the homogeneous dense phase catalyst bed is regenerated to about the same degree. Temperatures within the homogeneous dense phase bed are stable and hot-spots are avoided. Combustion of carbon monoxide to carbon dioxide in the homogeneous dense phase bed is enhanced as unduly large gas bubbles which pass rapidly through the bed are avoided. These and other advantages of the present invention will be discussed in the detailed description which follows.

BRIEF DESCRIPTION OF THE DRAWING

The Drawing is a schematic representation of a fluidized catalyst regeneration process embodying improvements of the present invention.

DETAILED DESCRIPTION OF THE INVENTION

Fluidized catalytic cracking processes employing the improved catalyst regeneration process of the present invention are operated for the conversion of hydrocarbon charge stock into lower boiling cracked hydrocarbons and coke. Such conversion of hydrocarbon charge is accomplished by contacting hydrocarbon charge with hot regenerated catalyst under cracking conditions in a fluidized catalytic cracking reaction zone. Hydrocarbon charge and regenerated catalyst may be contacted in a riser transport reactor, in a reactor vessel containing a dense phase fluidized bed of catalyst fluidized by the up-flowing hydrocarbon charge vapors, or in a reactor zone comprising both a riser transport zone and a dense phase catalyst bed. Reaction conditions for conversion of hydrocarbon charge include reaction temperatures in the range of about 850°-1100° F, reaction pressures in the range of 5-50 psig or higher, regenerated catalyst to hydrocarbon charge weight ratios (catalyst/oil ratios) of from about 2:1 to about 20:1, catalyst and hydrocarbon contact times of from about 10 seconds to about 5 minutes, and reactor superficial vapor velocities in the range of about 0.8 to 3.0 ft/sec. A substantial portion of the hydrocarbons in contact with the catalyst are in vapor phase with a minor portion being present as liquid phase or solid phase. Such solids and resulting in a decrease of catalyst activity. Cracking catalyst containing such solid and liquid hydrocarbons is referred to as spent catalyst. In such a fluidized catalytic cracking process, spent catalyst is treated for removal of such accumulated hydrocarbons and for regeneration of cracking activity. From the reaction zone of a fluidized catalytic cracking process, spent catalyst containing accumulated hydrocarbons is commonly transferred to a stripping zone wherein the spent catalyst is contacted with a stripping vapor (e.g. steam) at temperatures in the range of about 750°-1100° F for vaporization of at least a portion of the volatile hydrocarbons accumulated upon the catalyst. Volatilized hydrocarbons and stripping vapors are transferred from the stripping zone to the reaction zone. Stripped spent catalyst, containing nonvolatile hydrocarbon residues (commonly referred to as coke), is transferred to a regeneration zone wherein catalytic activity is restored to said catalyst by burning such coke from the spent catalyst with a molecular oxygen containing regeneration gas at an elevated temperature. Upon regeneration, hot regenerated catalyst, having restored activity, is transferred from the regeneration zone for contact with additional hydrocarbon charge in the reaction zone, as described above.

Catalysts, the regeneration of which the regenetion process of the present invention is well suited, include those catalyst commonly referred to as "zeolite" or "molecular sieve" cracking catalysts. Such catalyst will be referred to herein as zeolite catalyst for convenience in the discussion which follows. Such zeolite catalysts comprise about 95-85 wt.% amorphous refractory metal oxide matrix, and about 5-15 wt.% (preferably 8-10 wt.%) crystalline aluminosilicate zeolitic molecular sieves having uniform crystalline pore openings. Said matrix generally has substantial cracking activity and is selected from naturally occurring clays, and synthetic oxide mixtures such as silica-alumina, silica magnesia, silica-zirconia, etc. The zeolite portion of such zeolitic cracking catalysts comprise small particles of either natural or synthetic crystalline, aluminosilicate zeolitic molecular sieves, such as faujasite, chabazite, X-type and Y-type alumino-silicate molecular sieves, etc., having a major portion of their sodium content replaced by ion exchange with magnesium ions, rare earth ions, ammonium ions, hydrogen ions, and/or other divalent and polyvalent ions which enhance the activity of the catalyst. The process of the present invention is particularly well suited for use in regenerating those zeolite cracking catalyst promoted for increasing the rate of burning carbon monoxide to carbon dioxide within the regeneration zone. Such promoted zeolite catalysts may have controlled crystalline pore size, and contain small amounts of materials such as plantinum, nickel, iron, and other materials which catalyze the combustion of carbon monoxide to carbon dioxide at temperatures commonly employed in the regeneration of cracking catalysts.

Spent cracking catalysts, when transferred to a regeneration zone, such as described herein, contain from about 0.5 wt. percent to about 2.0 wt. percent coke. In regenerating such spent catalyst, wherein the coke is burned from the catalyst to restore catalytic activity thereto, zeolite catalysts may be subjected to temperatures somewhat above 1400° F without substantially degrading their catalytic activity. At temperatures above about 1500° F, the structure and/or composition of the catalyst is affected in such a way that the catalyst irreversably loses at least a portion of its catalytic activity.

Regeneration of catalyst in a fluidized catalytic cracking process comprises burning coke therefrom at an elevated temperature with a molecular oxygen containing regeneration gas. Generally, the regeneration gas is air, although other regeneration gases containing molecular oxygen, such as oxygen enriched air, steam and air mixtures, etc. may also be employed. The degree of regeneration of catalytic activity of a spent cracking catalyst is proportional to the degree of removal of coke from said catalyst. Lower residual carbon content of regenerated catalyst results in higher regenerated catalyst activity. The regenerated catalyst activity of zeolitic cracking catalyst appears to be somewhat more sensitive to residual carbon than the regenerated activities of amorphous cracking catalyst. Preferably, residual carbon content of regenerated catalyst is reduced to about 0.1 weight percent or less.

Hydrocarbon charge stocks within contemplation of the present invention are those which may be cracked to yield useful lower molecular weight hydrocarbon products. Examples of hydrocarbon charge stocks include virgin gas-oils, vacuum gas oils, atmospheric residua, topped crudes, shale oils, tar sand oils, virgin naphthas, cycle oil and cracked naphtha recycle streams from cracking processes, etc. A portion of all such hydrocarbon charge stocks when subjected to fluidized catalyst cracking are converted into coke. The proportion of hydrocarbon charge stock which is converted into coke is proportional to the boiling range of the particular charge stock and cracking severity within the reaction zone, and will vary from about 1 weight percent for some naphthas to about 10 weight percent or more for some residua.

DETAILED DESCRIPTION OF THE DRAWING

In order to demonstrate and provide a better understanding of the present invention, the improvement of the present invention will be described with reference to the Drawing. The Drawing is a schematic representation of fluidized catalyst regeneration process equipment embodying improvements of the present invention. It is to be understood that the Drawing is only in such detail as required for a clear understanding of the present invention, and that various elements commonly employed in commercial catalyst regeneration processes, such as valves, pumps, instrumentation, etc. which are unnecessary for a complete description of the present invention have been omitted for the sake of clarity.

In the Drawing, fluidized cracking catalyst regeneration apparatus is shown, including a vertical regeneration vessel 100 which comprises: a lower regenerator section 101 which comprises a hollow cylinder having a closed bottom and open top; and open ended frustoconic transition section 102, the bottom of which is an axial alignment, and in communication with the open top of lower regeneration section 101; and an upper regeneration section 103, comprising a hollow cylinder having a closed top and an open bottom in axial alignment with and in communication with the open top of said transition section 102. The internal cross-section area of lower regenerator section 101 is sufficient to provide a regeneration gas superficial vapor velocity in the range of about 2.5 to 6.0 ft/sec, and the volume of said lower regenerator section 101 is sufficient to provide a residence time of from about 3 minutes to about 20 minutes, at design flow rates and operating conditions, for catalyst maintained therein as a fluidized dense phase bed. The wall of transition section 102 has a conic angle of about 20° to 40° from the vertical and has sufficient height such that the increased cross-sectional area of the top of transition section 102 is sufficient for reducing the superficial vapor velocity of regeneration gas flowing therethrough from the range of about 2.0-6.0 ft/sec. to the range of about 1.0-2.2 ft/sec. Upper regenerator section 103 is of the same diameter and cross-sectional area as the top of transition section 102.

Accordingly, in the Drawing, spent, catalyst, containing about 0.1 to 1 weight percent coke, at a temperature in the range of about 750°-1100° F, from a reaction section (not shown) flows downward in a spent catalyst conduit 104 into the lower portion of regenerator vessel 100, and is discharged vertically downward, through a spent catalyst distributor 105 into the axial center of the lower regeneration section 101. Spent catalyst distributor 105 comprises a vertical, hollow member having side walls, an open top, an open bottom. The open top and open bottom of spent catalyst distributor 105 are substantially in axial alignment with the vertical central axis of lower regenerator section 101, the open bottom of spent catalyst distributor 105 terminates above a primary regeneration gas distribution means 109 (described below) near the bottom of lower regenerator section 101, and the open top of spent catalyst distributor 105 terminates in the lower portion of lower regenerator section 101. Any gas entrained in the spent catalyst flowing through spent catalyst conduit 104 into spent catalyst distributor 105, is disengaged and flows upward through the open top of spent catalyst distributor 105 into the interior of regenerator vessel 100.

In the Drawing, a primary regeneration gas at a temperature in the range of about 100°–600° F and containing about the stoichometric amount of molecular oxygen required for complete combustion of coke on spent catalyst to carbon dioxide and water, flows upward through a regeneration gas conduit 106 into the bottom of lower regenerator section 101. From the discharge end of regeneration gas conduit 106 primary regeneration gas flows into primary regeneration gas distribution means 109 which comprise an inlet gas plenum 107 in communication with a primary gas distributor 108. Inlet gas plenum 107 comprises a first hollow member having a plurality of openings directed radially into lower regenerator section 101 at an angle in the range of +20° to −20° from the horizontal. Inlet gas plenum 107 is axially concentric with said reactor vessel 100 and the top of inlet gas plenum 107 is below the bottom opening of said catalyst distributor 105 at a vertical distance equivalent to about ½ to 1 diameter of said bottom opening of catalyst distributor 105. Preferably, the diameter of the top of inlet gas plenum 107 is about equal to one-half the diameter of the bottom opening of catalyst distributor 105 such that the closed top of inlet gas plenum 107 serves as an impingement plate for spent catalyst discharging from catalyst distributor 105. Preferably the plurality of openings in inlet gas plenum 107 have a total cross-sectional area sufficient to provide primary regeneration gas exit velocities in the range of 65–175 ft/sec when from about 25–40 percent of primary generation gas flowing through regeneration gas conduit 106 exits inlet gas plenum 107 into regenerator vessel 100.

In the Drawing, primary gas distributor 108 is in communication with inlet gas plenum 107 for supplying about 60–75 percent of the primary regeneration gas from regeneration gas conduit 106 into regenerator section 101. Primary gas distributor 108 comprises a pipe forming a ring having a plurality of openings, directed downward at an angle within the range of about 30° to 60° from the horizontal, for radially distributing primary regeneration gas. The total cross-sectional area of said openings in primary gas distributor 108 is sufficient to provide a primary regeneration gas discharge velocity in the range of about 65–175 ft. per sec when from 60 to 75 percent of the primary regeneration gas from primary regeneration gas conduit 106 flows therethrough. Thus, spent catalyst flowing vertically downward is contacted with primary regeneration gas, flowing radially at turbulent flow conditions for thoroughly mixing spent catalyst and primary regeneration gas and distributing the catalyst-gas mixture across the bottom of lower regenerator section 101 at a temperature sufficient to initiate combustion of coke. Thus, a first regeneration zone is establixhed in the bottom of lower regenerator section 101. Residence time of catalyst in this first regeneration zone is sufficient for obtaining even distribution of spent catalyst and regeneration gas across the cross-sectional area of regenerator vessel 100, and is in the range of about 10 sec. to 1 minute.

In the Drawing, lower regenerator section 101 has a cross-sectional area sufficient to provide for a superficial vapor velocity in the range of from about 2.5 to 6.0 ft/sec. for regeneration gas flowing upward therethrough, such that spent catalyst and primary regeneration gas flowing upward from the first regeneration zone in the bottom of lower regeneration section 101 form a fluidized dense phase bed of catalyst undergoing regeneration. This fluidized dense phase bed of catalyst comprises a second regeneration zone in the main portion of lower regenerator section 101. In said second regeneration zone, operating conditions are maintained such that the fluidized dense phase bed of catalyst undergoing regeneration is fluidized by the upward flow of the regeneration gas and such that substantially all the coke is burned from the catalyst undergoing regeneration. In the second regeneration zone, the dense phase fluidized bed of catalyst has a density in the range of about 20–30 pounds per cubic imposed a dilute phase of catalyst suspended in spent regeneration gas. Operating conditions within the second regeneration zone for maintaining the catalyst undergoing regeneration as a fluidized dense phase bed, include regeneration temperatures in the range of about 1050–1350° F, catalyst residence times in the range of about 3–20 minutes, regeneration pressures at the top of the dense phase catalyst bed in the range of about 6–50 psig, regeneration gas superficial vapor velocities upward through the dense phase bed in the range of about 2.5 to 6.0 feet per second, and specific coke burning grates, based upon the inventory of catalyst in the dense phase bed, in the range of about 0.05–1.0 pounds of coke per hour per pound of catalyst. Under these operating conditions catalyst may be regenerated to a level that residual carbon on regenerated catalyst is 0.1 weight percent or less, and preferably 0.05 percent or less.

In the present invention, distribution of regeneration gas and catalyst in the first regeneration zone is even and homogeneous across the cross-sectional area of the second regeneration zone. By this means a homogeneous fluidized dense phase bed of catalyst undergoing regeneration is established. For improving this regeneration of catalyst, and overcoming any localized oxygen deficiencies of inhomogeneties within the fluidized dense phase bed, trim gas, comprising oxygen in an amount from about 1 to 10 mole percent of the stoichometric injection means 114 preferably comprise an essentially horizontal pipe having a plurality of openings for radially distributing trim gas downwardly into regenerator vessel 100 at an angle in the range of about 30° to 60° from horizontal. Trim gas is independently supplied to each of the trim gas distributors 114 via a separate trim gas conduit 115. Accordingly, in the present invention, in the event that a portion of the dense phase fluidized catalyst bed is deficient in oxygen, trim gas may be supplied independently to that oxygen deficient portion of the fluidized bed via one or more of trim gas distributors 114. In the event that additional oxygen is to be supplied to the entire fluidized dense phase bed, for improving catalyst regeneration or for increasing combustion catalyst bed is deficient in oxygen, trim gas may be supplied independently to that oxygen deficient portion of the fluidized bed via one or more of trim gas distributors 114. In the event that additional oxygen is to be supplied to the entire fluidized dense phase bed, for improving catalyst regeneration or for increasing combustion of carbon monoxide to carbon dioxide, then trim gas may be injected into the fluidized dense phase bed via all the trim gas distributors 114 simultaneously.

In the present invention, regenerated catalyst is withdrawn from the upper portion of the dense phase fluidized catalyst bed above the injection of trim gas and below the upper surface 122 of the fluidized catalyst bed via a ductway 110 which does not impede the smooth flow of catalyst and vapors within the fluidized dense phase catalyst bed. Regenerated catalyst from said regenerator catalyst ductway 110 flows into a regenerated catalyst standpipe 111, located outside regenerator vessel 100, wherein regenerated catalyst disengages regeneration gas entrained therein to form a settled bed of deaerated regnerated catalyst in the lower portion of said regenerated catalyst standpipe 111. Hot regenerated catalyst is transferred from the bottom of said regenerated catalyst standpipe 111 via slide valve 112 for contact with additional hydrocarbon charge stock in the reaction zone (not shown) of a fluidized catalytic cracking process. Regeneration gas separated from the regenerated catalyst flows from the top of said regenerated catalyst standpipe 111 via line 113 into the dilute catalyst phase which is imposed upon the dense phase fluidized catalyst bed.

Accordingly, in the process of the present invention, a homogeneous fluidized dense phase bed of catalyst undergoing regeneration is established in the second regeneration zone such that well mixed spent catalyst and primary regeneration gas continuously enter the bottom of the fluidized dense phase bed and regenerated catalyst is continuously withdrawn from near the top of the fluidized dense phase bed. By utilizing the flow pattern of catalyst and regeneration gas through the dense phase bed, and by avoiding internal projections and structures within the upper portion of lower regeneration section 101, a homogeneous dense phase bed of fluidized catalyst undergoing regeneration is established without undue coalescense of gas bubbles or catalyst short circuit streams.

In the drawing, as previously stated, the open top of lower regenerator section 101 is in communication with the open bottom of transition section 102 for allowing flow of regeneration gas and entrained catalyst from the upper surface of the fluidized dense phase catalyst bed maintained in lower regenerated section 101 into upper regenerator section 103 wherein a dilute phase of catalyst suspended in spent regeneration gas is maintained as a dilute phase regeneration zone.

In the present invention, a spent regeneration gas comprising nitrogen, carbon dioxide, carbon monoxide, and substantially spent in molecular oxygen, and with a small amount of catalyst entrained therein, disengages the upper surface 122 of the fluidized dense phase catalyst bed and enters conical transiton section 102, In transition section 102, the cross-sectional area of the regenerator vessel 100 is increased such that the superifical vapor velocity of the spent regeneration gas decreases from about 2.5–6.0 ft/sec at the bottom, to a rate in the range of 1.0 to about 2.2 ft/sec at the top of transition section 102. Upon decreasing the superficial vapor velocity of spent regeneration gas within transition section 102, substantial amounts of entrained catalyst are allowed to return, under the influence of gravity, to the top of the dense phase fluidized catalyst bed.

The spent regeneration gas disengaging the top of the fluidized dense phase catalyst bed 122 is substantially depleted in oxygen and may contain a substantial concentration of carbon monoxide from incomplete combustion to coke in the fluidized dense phase bed. For avoiding air pollution, such carbon monoxide is desirably combusted to carbon dioxide within regenerator vessel 100. With unpromoted zeolite containing fluidized cracking catalyst in the regeneration zone dense phase fluidized catalyst bed, increased temperatures result in increased combustion of carbon monoxide to carbon dioxide such that at about 1350° F the carbon monoxide content of spent regeneration gas will be less than 1% by weight and preferably is less than about 200 parts per million weight (ppmw) under regeneration conditions employed herein. When catalysts promoted for combustion of carbon monoxide to carbon dioxide are employed, essentially complete combustion of carbon monoxide to carbon dioxide in the dense phase fluidized catatlyst bed can be obtained at substantially lower temperatures in the range of about 1250° F or less. In the event that combustion of carbon monoxide in the dense phase fluidized bed is incomplete and substantial amounts of carbon monoxide are present in spent regeneration gas entering the transition zone, additional oxygen containing regeneration gas, sufficient to provide from about 1 to about 10 mole percent of the stoichometric amount of oxygen required for combustion of the coke on spent catalyst to carbon dioxide and water, is introduced into the spent regeneration gas and entrained catalyst at an elevation within said transition zone 102 such that the superficial velocity of the dilute phase flowing upward from the top transition zone 102 does not exceed about 2.2 feet per second. This additional oxygen injected into the transition section results in substantially complete combustion of carbon monoxide to carbon dioxide. The portion of catalyst entrained in the spent regeneration gas which falls back to the upper surface of the dense phase fluidized catalyst bed from the transition zone under the influence of gravity carries a substantial amount of the heat generated from the combustion of carbon monoxide to carbon dioxide back to the dense phase fluidized catalyst bed, such that the temperature of the dilute phase does not increase above the temperature (about 1500° F) at which entrained catalyst will be seriously deactivated. Within regenerator transition section 102, secondary regeneration gas distributor 116 is positioned horizontally for injection of secondary oxygen containing regeneration gas into reactor vessel 100 for substantially complete combustion of carbon monoxide to carbon dioxide. Secondary regeneration gas distributor 116 comprises a header having a plurality of openings for radially distributing secondary regeneration gas into said transition section 102 at an angle of from about 0° to about 450° downward from horizontal. Total cross-sectional area of openings in said secondary regeneration gas distributor 116 is such that the discharge velocity of secondary regeneration gas does not exceed about 200 ft. per sec. when the rate of secondary regeneration gas is equivalent to about 5 percent of primary regeneration gas entering regeneration vessel 100 via regeneration gas conduit 106. Secondary regeneration gas is supplied to secondary regeneration gas distributor 115 via conduit 117. Secondary regeneration gas distributor 116 is located at a height in regenerator transition section 102 such that the superficial vapor velocity of gases flowing upward through the open top of regenerator transition section 102 does not exceed about 2.2 ft/per sec. when superficial vapor velocity in first regenerator section 101 is in the range of 2.5 to 6.0 ft/sec and when the flow rate of secondary regeneration gas is equivalent to about 5 percent of the primary regeneration gas rate.

In the Drawing, the open top of regenerator transition section 102 is in communication with the open bottom of upper regeneration section 103 for flow of spent regeneration gas and entrained catalyst into the dilute catalyst phase maintained in upper regenerator section 103. The cross-sectional area of upper regenerator section 103 is the same as the top of transition section 102, such that the superficial vapor velocity of gas flowing therethrough is in the range of about 1.0 to 2.2 ft/sec. In the present invention, spent regeneration gas and entrained catalyst, comprising a dilute phase having carbon monoxide essentially completely burned to carbon dioxide, exits the top of said transition section 102 into upper regenerator section 103, forming a dilute phase regeneration zone. From said dilute phase regeneration zone, spent regeneration gas and entrained catalyst flow into cyclone separators 117 wherein entrained catalyst gas is essentially completely separated from spent regeneration. From said cyclone separators 117 spent regeneration gas flows into a plenum 120 and is removed from regeneration vessel 100 via a vent line 121 as a flue gas essentially free of entrained catalyst. Catalyst separated from spent regeneration gas in cyclone separators 117 is returned to said first regeneration zone 101 wherein said hot separated catalyst is intimately mixed with spent catalyst and regeneration gas entering said first regeneration zone for increasing the temperature therein such that combustion of coke is enhanced. In the present invention, it is contemplated that cyclone separators 117 may comprise one or more cyclone separators in series and/or parallel arrangement for substantially completely separating entrained catalyst from the spent regeneration gas. For the purposes of clarity, only one separator 117 is shown. Line 118, in communication with the bottom of separator 117 extends downward into lower regenerator section 101, terminating at about the level at which spent catalyst discharges from spent catalyst distributor 105. Entrained catalyst, separated from spent regeneration gas in separator 117 flows downward, at regeneration temperatures, through line 118 and discharges into the bottom of lower regenerator section 101 wherein the hot catalyst mixes with spent catalyst and primary regeneration gas, increasing the temperature thereof and improving the initiation of coke burning on the spent catalyst.

In the Drawing, a Line 119 communicates with the top of separator 117 and plenum 120. Plenum 120 is attached to the top of upper regenerator section 103. Separated spent regeneration gas, separated from entrained catalyst in cyclone separator 117 flows through line 119 into plenum 120. Vent line 121 communicating with plenum 120 provides means for removing spent regeneration gas from the fluidized catalytic cracking unit as flue gas.

In a fluid cracking process employing the improved regeneration process of the present invention, spent cracking catalyst containing about 0.5 wt.% to 2.0 wt.% coke is transferred downward into the axial center of the first regeneration zone wherein said spent catalyst is contacted with primary regeneration gas flowing radially into said first regeneration zone under turbulent flow conditions for intimately mixing said spent catalyst and regeneration gas, and even distributing the resulting mixture across the cross-sectional area of said first regeneration zone. Primary regeneration gas is supplied to the first regeneration zone in an amount sufficient to provide about the stoichiometric molecular oxygen required for complete combustion of coke on spent catalyst to carbon dioxide and water. Spent catalyst entering said first regeneration zone is at a temperature in the range of about 750°–1100° F, and primary regeneration gas entering the first regeneration zone at a temperature in the range of about 100°–600° F, such that combustion of coke upon spent catalyst is initiated. Residence time of spent catalyst in said first regeneration zone is sufficient for obtaining even distribution of spent catalyst and regeneration gas across the cross-sectional area of the first regeneration zone and is in the range of about 10 seconds to 1 minute. From said first regeneration zone, spent catalyst and regeneration gas flow upwardly into a second regeneration zone. In said second regeneration zone, operating conditions are maintained such that a dense phase bed of catalyst undergoing regeneration is fluidized by the upward flow of the primary regeneration gas and wherein substantially all the coke is burned from the catalyst undergoing regeneration. In the second regeneration zone, the dense phase fluidized bed of catalyst has a density in the range of about 20–30 pounds per cubic foot and has an upper surface above which is superimposed a dilute phase of catalyst suspended in regeneration gas. Operating conditions within the second regeneration zone for maintaining the fluidized dense phase catalyst bed and obtaining the degree of regeneration desired, include regeneration temperatures in the range of about 1050°–1350° F, catalyst residence times in the range of 3–20 minutes, regeneration pressures at the top of the dense phase catalyst bed in the range of about 6–50 psig, regeneration gas superficial vapor velocities upward through the dense phase bed in the range of about 2.5 to 6.0 feet per second, and specific coke burning rates, based upon the inventory of catalyst in the dense phase bed, in the range of about 0.05 to 1.0 pounds of coke per hour per pound of catalyst. Under these regeneration conditions, residual carbon on regenerated catalyst may be reduced to 0.1 weight percent or preferably 0.05 weight percent or less, and substantial amounts of carbon monoxide is combusted to carbon dioxide.

In the present invention, distribution of primary regeneration gas and catalyst in the first regeneration zone is such as to provide a continuous, even distribution of primary regeneration gas and catalyst to the bottom cross-sectional area of the second regeneration zone, and regenerated catalyst is continuously withdrawn from the top of the second regeneration zone. By this means a homogeneous fluidized dense phase bed of catalyst free of unduly large coalessed gas bubbles and catalyst short circuit streams is established, thus providing good regeneration of catalyst within the second regeneration zone. For improving regeneration of catalyst, and overcoming any inhomogeneities within the fluidized dense phase bed, trim gas, comprising oxygen in an amount from about 1 to 5 mole percent of the stoichometric amount of oxygen required for complete combustion of coke to carbon dioxide and water, may be injected selectively through a plurality of trim gas injection means below the upper surface of the fluidized dense phase bed. Trim gas is injected such that additional oxygen may be provided to portions of the fluidized dense phase bed which may be oxygen deficient, thereby providing for an equal degree of regeneration of catalyst and/or addition combustion of carbon monoxide to carbon dioxide across the cross-sectional area of the dense phase bed.

In the present invention, regenerated catalyst is withdrawn from the upper portion of the dense phase fluidized catalyst bed above the injection of trim gas and below the upper surface of said fluidized catalyst bed via means which do not have projections extending into the fluidized dense phase which may impede the smooth flow of catalyst and regeneration gas. The withdrawn regenerated catalysts flows into a regenerated catalyst standpipe located external to the second regeneration zone, wherein regenerated catalyst disengages regeneration gas entrained therein to form a bed of deaerated regenerated catalyst in the lower portion of the regenerated catalyst standpipe. Hot, regenerated catalyst is transferred from the regenerated catalyst standpipe for contact with additional hydrocarbon charge stock in the reaction zone of the fluidized catalytic cracking process. Regeneration gas separated from the regenerated catalyst flow from the regenerated catalyst standpipe section in the dilute catalyst phase which is present above the dense phase fluidized catalyst bed.

In the present invention, regeneration gas comprising nitrogen, carbon dioxide, carbon monoxide, substantially spent in molecular oxygen, and having a small amount of catalyst entrained therein, disengages the upper surface of the fluidized dense phase catalyst bed and enters the bottom of a transition zone. Within the transition zone the cross-section area is increased such that the superficial vapor velocity of the upflowing spent regeneration gas decreases to a value in the range of about 1.0 to about 2.2 feet per second at the top of the transition zone. Upon decreasing the superficial vapor velocity of spent regeneration gas within the transition zone, a major portion of the entrained catalyst returns, under the influence of gravity, to the top of the fluidized dense phase catalyst bed and a minor portion remains entrained in the spent regeneration gas.

The ratio of carbon dioxide to carbon monoxide within spent regeneration gas may vary from about 1:1 to about 500:1 or greater depending upon operating conditions within said fluidized dense phase catalyst bed. As carbon monoxide is a serious air pollutant, it is desirable that as much as possible be burned to carbon dioxide within the regeneration process. With unpromoted zeolite catalyst in the regeneration zone fluidized dense phase catalyst bed, increased temperatures result in increased combustion of carbon monoxide to carbon dioxide such that at regeneration temperatures in the range of about 1350°-1450° F, the carbon monoxide content of spent regeneration gas will be less than 1% by weight and preferably is less than about 500 parts per million (ppmw) under regeneration conditions employed herein. When zeolite catalysts promoted for combustion of carbon monoxide to carbon dioxide are employed, essentially complete combustion of carbon monoxide to carbon dioxide may be obtained at substantially lower temperatures in the range of about 1250° F. In the event that combustion of carbon monoxide in the dense phase fluidized bed is incomplete and substantial amounts of carbon monoxide are present in the spent regeneration gas entering the transition zone, secondary regeneration gas, secondary regeneration gas, sufficient to provide from about 1 to about 5 mole percent of the stoichometric amount of oxygen required for complete combustion of the coke on spent catalyst, is introduced into the transition zone. This additional oxygen injected into the dilute phase enables substantially complete combustion of carbon monoxide to carbon dioxide in the transition zone at regeneration temperatures and pressures employed in the process of the present invention. The major portion of catalyst entrained in the spent regeneration gas, which falls back to the upper surface of the dense phase fluidized catalyst bed from the transition zone under the influence of gravity, carries a substantial amount of the heat generated from the combustion of carbon monoxide to carbon dioxide back to the dense phase fluidized catalyst bed, such that the temperature does not increase above the temperature at which entrained catalyst will be deactivated (e.g. above about 1450°).

In the present invention, spent regeneration gas and the minor portion of entrained catalyst exits the top of said transition zone as a dilute phase into a third regeneration zone. In said third regeneration zone, the dilute phase of catalyst suspended in regeneration gas is maintained at regeneration conditions including dilute phase densities in the range of about 0.1 to 1.0 lb/cu ft., regeneration gas superficial vapor velocities in the range of 1.0 to 2.2 ft/sec., pressures in the range of 5-50 psig, and temperatures in the range of about 1150°-1450° F. At such regeneration conditions, additional coke is burned from catalyst present in the dilute phase, and additional carbon monoxide is combusted to form carbon dioxide. From said third regeneration zone, spent regeneration gas and entrained catalyst flow into a cyclone separation zone wherein entrained catalyst is essentially completely separated from spent regeneration gas. The separated, spent regeneration gas, essentially free of entrained catalyst, is removed from the regeneration process as a flue gas.

Separated catalyst, from said separation zone, at a temperature in the range of about 1150°-1450° F is returned to said first regeneration zone wherein said separated catalyst is intimately mixed with additional spent catalyst and primary regeneration gas. The hot, separated catalyst contributes additional heat to said first regeneration zone, increasing the temperature therein such that combustion of coke on spent catalyst is enhanced.

By following the catalyst regeneration method set-out herein, spent fluidizable zeolite cracking catalysts may be regenerated to yield a regenerated catalyst having 0.1 wt. % or less residual carbon thereon, and to yield a regeneration flue gas substantially depleted in carbon monoxide. By adjusting regeneration conditions within the operational ranges disclosed herein, carbon on regenerated catalyst may be reduced to about 0.05 wt. % or less, and carbon monoxide in the flue gas may be reduced to 500 ppm or less. Thus, having described herein the method of the present invention, it is to be understood that no undue restriction be imposed by reason thereof, and that only such limitations are to be imposed as are contained in the appended claims.

We claim:

1. In a fluidized catalytic cracking process wherein a coke-contaminated, spent cracking catalyst is regenerated, in a single regenerator vessel, by burning coke therefrom at an elevated temperature with a molecular oxygen containing regeneration gas for producing a regenerated catalyst and a flue gas comprising oxides of carbon, the improvement which comprises:

a. flowing hot, spent catalyst substantially vertically downward into the radial center of a first cylindrical regeneration zone having a closed bottom and open top;

b. flowing oxygen containing primary regeneration gas radially into said first regeneration zone under conditions of turbulent flow, for intimately mixing said spent catalyst and primary regeneration gas within said first regeneration zone;

c. flowing said mixture of primary regeneration gas and spent catalyst upwardly from the open top of said first regeneration zone into the bottom of a second cylindrical regeneration zone, having an open bottom and open top, forming a dense phase bed of catalyst undergoing regeneration fluidized by the flow of regeneration gas therethrough, said fluidized dense phase catalyst bed having a top surface, a temperture in the range of about 1050°-1450° F, a catalyst residence time in the range of about 3-20 minutes, a specific coke burning rate in the range of about 0.05 to 1.0 lb coke/hour/lb catalyst, and a regeneration gas superficial vapor velocity in the range of about 2.5 to 6.0 ft/sec;

d. withdrawing, via a regenerated catalyst ductway, hot regenerated catalyst from the upper portion of said fluidized dense phase catalyst bed for contact with a hydrocarbon charge stock in a reaction zone;

e. flowing a trim gas containing molecular oxygen radially in a downward direction of about 30° to about 60° from horizontal into said fluidized dense phase catalyst bed at a vertical elevation below said regenerated catalyst duct, at a rate to provide the equivalent of 1-10% of the oxygen supplied in said primary regeneration gas;

f, flowing spent regeneration gas, substantially depleted in oxygen and containing entrained catalyst, from the top surface of said fluidized dense phase catalyst bed through the open top of said second regeneration zone into the bottom of a frustoconic transition zone, having an open bottom and an open top, wherein said regeneration gas superficial vapor velocity is reduced to about 1.0 to 2.2 ft/sec, such that a major portion of catalyst entrained therein returns to said dense phase bed under the influence of gravity and such that a dilute phase of catalyst entrained in spent regeneration gas is formed;

g. flowing a secondary regeneration gas containing molecular oxygen radially in a direction in the range from about horizontal to about 45° downward from horizontal into said transition zone at a rate to provide an amount of oxygen equivalent to about 1-10% of the oxygen supplied in said primary regeneration gas, for combusting substantially all carbon monoxide in said spent regeneration gas to carbon dioxide in said transition zone;

h. flowing said dilute phase of catalyst entrained in spent regeneration gas upwardly through the open top of said transition zone into the bottom of a cylindrical third regeneration zone, having an open bottom and a closed top, wherein said dilute phase is maintained at a temperature in the range of 1150°-1450° F, a pressure in the range of 6-50 psig, a density in the range of 0.1 to 1.0 lb/cu ft., and having a spent regeneration gas superficial vapor velocity in the range of 1.0 to 2.2 ft/sec;

i. flowing said dilute phase from said third regeneration zone into a solid-gas separation zone for separation into a flue gas essentially free of entrained catalyst and separated catalyst;

j. venting said flue gas from said separation zone; and k. flowing said separated catalyst, via a catalyst dipleg, from said separation zone to said first regeneration zone for admixture with additional spent catalyst and primary regeneration gas.

2. The process of claim 1 wherein said oxygen containing primary regeneration gas flowing into said first regeneration zone is sufficient to provide about the stoichometric amount of oxygen required for complete combustion of coke on spent catalyst; and wherein spent catalyst residence time in said first regeneration zone is in the range of from about 10 seconds to 1 minute, sufficient for intimate mixing of spent catalyst and primary regeneration gas and for distribution of the spent catalyst-primary regeneration gas mixture within said first regeneration zone.

3. The method of claim 2 wherein the top of said first regeneration zone is in vertical axial alignment, and in open communication with the bottom of said second regeneration zone.

4. The method of claim 3 wherein pressure, residence time of catalyst, and specific coke burning rate in said second regeneration zone are adjusted within their respective ranges for burning coke from spent catalyst to produce regenerated catalyst having 0.1 wt.% residual carbon, or less.

5. The method of claim 3 wherein regenerated catalyst has 0.05 wt.% residual carbon, or less.

6. The method of claim 4 wherein the top of said second regeneration zone is in open communication and in vertical axial alignment with the bottom of said transition zone.

7. The method of claim 4 wherein regenerated catalyst from said regenerted catalyst ductway is deaerated in a regenerated catalyst standpipe to form a settled bed of hot regenerated catalyst and deaerated regeneration gas.

8. The method of claim 1 wherein the deaerated regeneration gas flows, via a line from the top of said regenerated catalyst standpipe into said third regeneration zone.

9. The process of claim 1 wherein a substantial portion of the heat of carbon monoxide combustion is adsorbed by entrained catalyst in the transition zone, and is transferred from the transition zone by the portion of entrained catalyst which settles back to the dense phase fluidized bed under the influence of gravity.

* * * * *